US012580734B2

(12) United States Patent
Rady

(10) Patent No.: US 12,580,734 B2
(45) Date of Patent: *Mar. 17, 2026

(54) METHOD FOR IRREFUTABLY IDENTIFYING PHYSICAL ITEMS

(71) Applicant: Max Adel Rady, Courbevoie (FR)

(72) Inventor: Max Adel Rady, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 19/252,415

(22) Filed: Jun. 27, 2025

(65) Prior Publication Data

US 2025/0323779 A1      Oct. 16, 2025

Related U.S. Application Data

(63) Continuation of application No. 18/758,378, filed on Jun. 28, 2024, now Pat. No. 12,375,261, which is a continuation of application No. 18/061,662, filed on Dec. 5, 2022, now Pat. No. 12,401,496, which is a continuation of application No. 16/987,775, filed on Aug. 7, 2020, now Pat. No. 11,552,784, which is a continuation of application No. 16/657,156, filed on Oct. 18, 2019, now Pat. No. 10,790,966, which is a continuation of application No. 16/289,083, filed on Feb. 28, 2019, now Pat. No. 10,469,250, which is a continuation of application No. PCT/US2018/067200, filed on Dec. 21, 2018.

(60) Provisional application No. 62/609,783, filed on Dec. 22, 2017.

(51) Int. Cl.
*H04L 29/06* (2006.01)
*H04L 9/06* (2006.01)
*H04L 9/08* (2006.01)
*H04L 9/32* (2006.01)
*H04L 9/00* (2022.01)

(52) U.S. Cl.
CPC .......... *H04L 9/0637* (2013.01); *H04L 9/0866* (2013.01); *H04L 9/3226* (2013.01); *H04L 9/3239* (2013.01); *H04L 9/3247* (2013.01); *H04L 9/3278* (2013.01); *H04L 9/50* (2022.05)

(58) Field of Classification Search
CPC ... H04L 9/0637; H04L 9/0866; H04L 9/3226; H04L 9/3239; H04L 9/3247; H04L 9/3278; H04L 9/50
See application file for complete search history.

(56) References Cited

U.S. PATENT DOCUMENTS

| | | | | |
|---|---|---|---|---|
| 9,876,645 | B1 * | 1/2018 | Ramalingam | G06F 21/57 |
| 10,467,586 | B2 * | 11/2019 | Fuller | H04L 9/3247 |
| 2016/0150213 | A1 * | 5/2016 | Mutti | G06V 20/20 |
| | | | | 348/143 |
| 2017/0091783 | A1 * | 3/2017 | Mancevski | G06K 19/06028 |

(Continued)

*Primary Examiner* — Malcolm Cribbs
(74) *Attorney, Agent, or Firm* — Whiteford, Taylor & Preston, LLP; Peter J. Davis

(57) ABSTRACT

There is provided a framework to record to a blockchain unique identification (signatures) of physical items which have unique, random properties. Physical items are analysed using spectral imaging to determine the unique identifications. Hardware is shown to perform the analysis and various nodes of a peer-to-peer network are shown and described, which nodes may be configured to provide proof of location, privacy, trust and authentication. The solution can work even if the item is modified in some way if a subset of the unique properties remain.

26 Claims, 9 Drawing Sheets

(56) References Cited

U.S. PATENT DOCUMENTS

| 2018/0018627 A1* | 1/2018 | Ross | ..................... G06F 16/583 |
| 2018/0053312 A1* | 2/2018 | Ross | ...................... G06T 7/248 |
| 2019/0108677 A1* | 4/2019 | Blondel | ................... G06T 7/55 |

* cited by examiner

METHOD FOR IRREFUTABLY IDENTIFYING PHYSICAL ITEMS

BACKGROUND

Blockchain technologies implement distributed ledgers on peer-to-peer networks. Data is stored securely using cryptography and various consent mechanisms are employed with a view to ensuring data stored in a block of the distributed leger is accurate and reliable.

Blockchains provide a way to trace unique digital items without reliance on a third party. Blockchains breakdown when mapping to physical real-world items due to the requirement of having to trust some sort of the third party. As Satoshi mentions in his paper, reliance on a third party immediately destroys/diminishes the use of blockchain—despite current hype around "putting it on the blockchain".

SUMMARY

There is proposed a framework to record to a blockchain unique identification (signatures) of physical items which have unique, random properties. Physical items are analysed (e.g. using spectral imaging and 3D scanning) to determine the unique identifications. Hardware is shown to perform the analysis and various nodes of a peer-to-peer network are shown and described, which nodes may be configured to provide proof of location, privacy, trust and authentication. The solution can work even if the item is modified in some way if a subset of the unique properties remain.

There is provided a network node comprising: one or more processing devices; a storage device, for example, memory, coupled to the one or more processing devices and storing instructions for execution by at least some of the one or more processing devices; a communications subsystem, coupled to the one or more processing devices, to communicate with at least one or more other nodes of a peer-to-peer network; and item analysis components coupled to the one or more processing devices, the item analysis components configured to determine analysis data from measurements generated by the item analysis components. The one or more processing devices operate to configure the network node to: analyze an instance of a physical item using the item analysis components to determine a unique signature for the instance, the unique signature determined using the analysis data for the physical item; determine, using the unique signature, whether the instance of the physical item is previously recorded to a blockchain maintained by the peer-to-peer network to provide item tracking and authentication services; and record the instance of the physical item to the blockchain in response to the determining whether the instance is previously recorded.

The item analysis components may comprise one or more of: a spectral imager to assess the spectral hypercube data of the physical item, identifying irregularities in composition of the physical item, notably the radiometric measurements at various spatial frequencies; a light source (e.g. Xenon based) to provide broad spectrum illumination on the physical item; a range scanner (e.g. laser based) to assess the 3D spatial data of the object; a calibration target to determine a geometric relationship between a range scanner and the imager; an HD photography camera; a scale to determine a mass of the physical item; and a mechanism of movement (e.g. a movable platter, platform or gantry) to move the physical item and assessment devices relative to one another to allow a 360-degree assessment of the physical item.

The item analysis components may be housed in a cabinet to receive the physical item for assessment.

The network node may be configured to use 3D spatial mapping to define the unique signature from spectral analysis data and 3D scan data generated by the item analysis components.

To determine whether the physical item is previously recorded may comprise comparing the unique signature generated by the network node to previously recorded unique signatures using 3D spatial analysis techniques, rotating in virtual space features of the physical item defined in the unique signature to determine a match with features defined in the previously recorded unique signatures.

The network node may be configured to provide proof of identity data to the peer-to-peer network to record the instance of the physical item.

The network node may be configured to provide reputational data to the peer-to-peer network to record the instance of the physical item. The reputational data is maintained and provided for use in accordance with a Blockchain Authentication and Trust Module (BATM) framework implemented by the peer-to-peer network.

The network node may be configured to provide proof of location to the peer-to-peer network for recording with the instance of the physical item. The network node may further comprise a location determination device configured to receive signals via the communication subsystem with which to determine a position of the network node. The communication subsystem may be configured to communicate using short range communications and the network node may be further configured to communicate with one or more witness nodes via short range communications to provide collaboration of the position of the network node.

The instance of a physical item may be a modified physical item defined from a previously recorded physical item. The network node may be configured to: analyze the instance of the modified physical item using the item analysis components to determine a unique signature for instance of the modified physical item, the unique signature determined using the analysis data for the instance of modified physical item; determine, using the unique signature, whether the instance of the modified physical item is previously recorded including whether recorded as the previously recorded physical item; and record the instance of the modified physical item to the blockchain in response to the determining whether the instance is previously recorded.

There is provided a computer implemented method for a network node comprising: one or more processing devices; a storage device, for example, memory, coupled to the one or more processing devices and storing instructions for execution by at least some of the one or more processing devices; a communications subsystem, coupled to the one or more processing devices, to communicate with at least one or more other nodes of a peer-to-peer network; and item analysis components coupled to the one or more processing devices, the item analysis components configured to determine analysis data from measurements generated by the item analysis components; wherein the method comprises analyzing an instance of a physical item using the item analysis components to determine a unique signature for the instance, the unique signature determined using the analysis data for the physical item; determining, using the unique signature, whether the instance of the physical item is previously recorded to a blockchain maintained by the peer-to-peer network to provide item tracking and authentication services; and recording the instance of the physical item to the blockchain.

There is provided a system comprising: a plurality of network nodes co-located at a field location, the plurality of nodes coupled for communication to a peer-to-peer network implementing a distributed leger providing a system to track and authenticate items, wherein a one of the plurality of network nodes is configured in accordance with the network node such has summarized herein to define an item assessment node. In one feature, at least one other of the plurality of network nodes comprises a witness node configured to communicate using short range communication with the item assessment node to provide a witness in a proof-of-location method used by the item assessment node.

In any of the aspects, the item analysis components may be configured to measure physical features comprising any of anomalies, defects, imperfections, noise and geometric irregularities that are either naturally occurring or human made through a process to produce a unique non-reproducible randomness that uniquely identifies an asset.

DESCRIPTION

Figure 1:
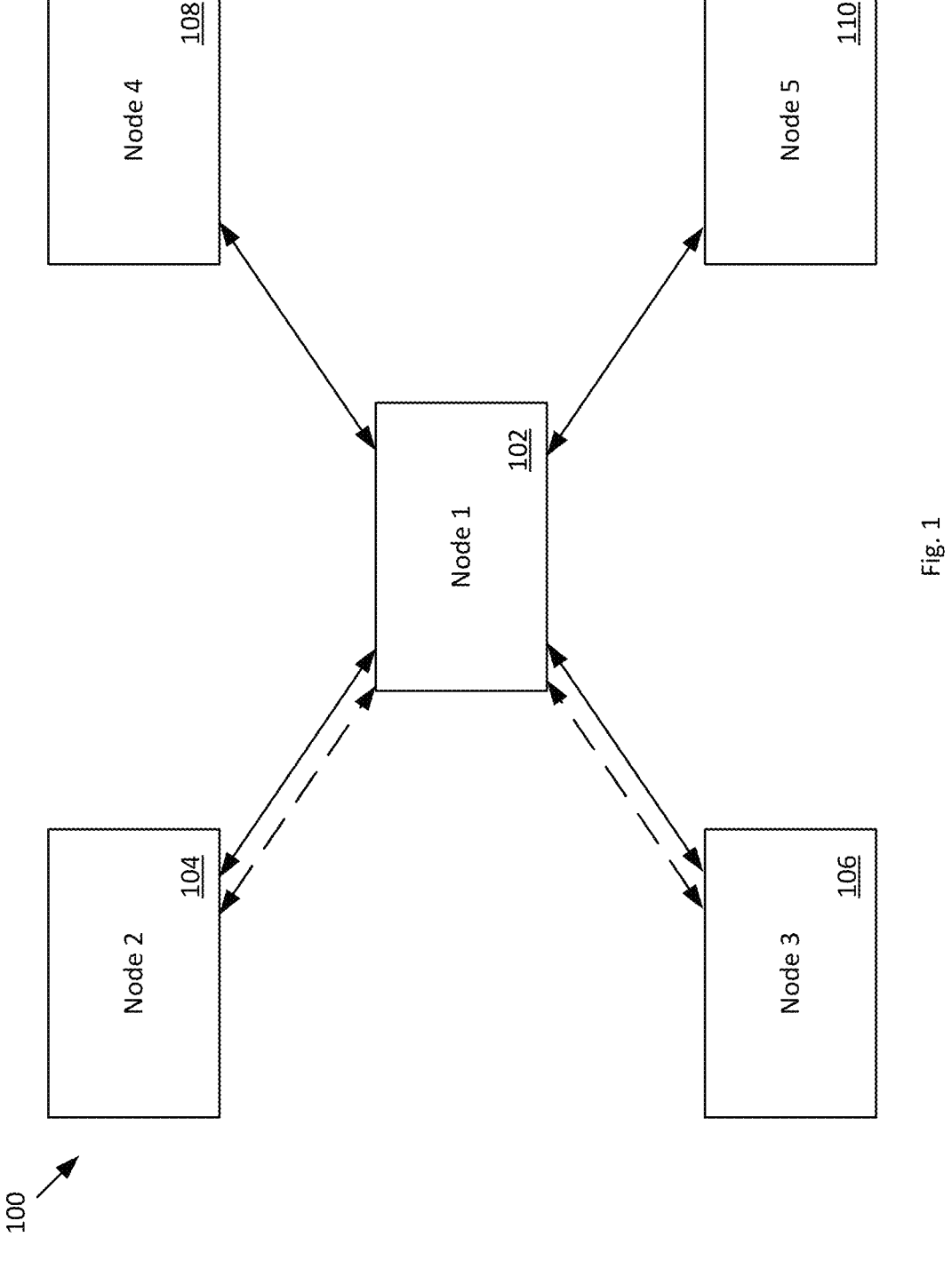
FIG. 1 is an illustration of a portion of a peer-to-peer network including a plurality of different types of nodes in accordance with an example.

Blockchains provide a potential gateway for a variety of solutions to provide transparency to asset management. However, until now, they've only been really applicable to digital assets and with some limited success to physical assets. However, the methods described so far don't provide a truly robust method for asset provenance, which greatly diminishes the use of blockchain, as described by Satoshi himself, nor do they provide a true end-to-end framework for this problem space; by that we mean that if you can achieve self-provenance of the asset, how do you ensure the hardware assessing the properties of the asset do what they state they do, or that they're valid actors and not a man in the middle (MITM) attacker. Furthermore, what happens if the object is modified in anyway, the unique hash can't be equal to the previous hash as there has been some loss of "data" since the current attempted block and the previous recorded block. Solving these problems may allow for a fully transparent asset and supply chain management, which doesn't rely on outside trust in any way, and offers complete tracking of the asset.

Overview Example Using Gemstones (e.g. Diamonds)

Diamonds have a unique property which is that they have carbon imperfections/carbon flaws. These flaws are unique in 3D space in the diamond's shape and type. Further general information on same is available at http://www.jewelry-secrets.com/Blog/black-spots-in-diamonds/, incorporated herein by reference in its entirety.

An analysis system may be configured to analyse an item such as a gemstone to determine its unique properties (e.g. in analysis data) thereby to define a unique signature for the item. Herein the terms imperfections, flaws, variations, defects, noise, geometric irregularities, occlusions, anomalies, etc. are used interchangeably for denoting features which may be evaluated by 3d scanning, spectral analysis and other measuring as described and as may be applicable to generate analysis data for an asset. Such analysis data determines the assets unique properties and is useful to define a unique signature for the asset. It is understood that not all physical assets will have each type of physical feature to assess. An analysis system may comprise a "box/device" which comprises:

a. A scale to record mass
        i. This captures the mass of the object in question.
    b. A 3D/LIDAR scanner
        i. This captures the geometry of the diamond in question.
    c. A high-resolution camera, which can quickly take pictures of the diamond from any angle.
    d. A spectral imaging camera.

If a diamond is mined, one can cut/polish/clean one side of the diamond (although it is possible to apply a similar technique to rough stones as mentioned here: http://www.o-gisystems.com/scanoxplanner-diamond-planning.html), /, incorporated herein by reference in its entirety.

Once this is done, the diamond is placed in the "box/device" in a position that allows the light to shine through one end and exit through the newly cut/polished/cleaned side.

The "box/device" then records its mass, geometry, and 3D space aware pictures of the diamond relative to its geometry, as well as spectral data.

The values then act as the encryption value to be placed into the block as a first blockchain entry.

From here, the diamond can be passed to the next party to be processed or to change hands, e.g. cut to the shape the jeweller wants, where upon receipt the next party confirms the identity of the diamond by inserting it into the "box/device". The orientation of the diamond is irrelevant at this stage and it may simply be positioned in the "box/device". The "box/device" now proceeds to record the new mass, geometry, and take photographic images with 3D space awareness relative to its 3D geometry.

The diamond is then re-oriented in virtual space, through similar techniques as described in 3D graphical rendering when taking an object from real-world space to object-world space, to align two of the imperfections (and their 3D spatial data, as well as spectral data) with the previous blockchain entry; once this is done, operations simply rotate along that axis and confirm that all N original imperfections sufficiently match. (For some 3D graphical rendering techniques, reference may be had to Pharr, M., Jakob, W., & Humphreys, G. (2017). Physically basedrendering: from theory to implementation (3rd ed.). Amsterdam; Boston; Heidelberg: Elsevier, at Chapter 4 with special interest to section 4.1.2, incorporated herein by reference in its entirety.)

If true, then the diamond is the same one and this validates the transaction or appraisal of the diamond. If false, then the diamond is not the same one and the transaction is not valid or if this is an appraisal of the diamond it is rejected.

However, the jeweller/client may wish to modify the diamond by processing or reshaping it; If this is the case then perform operations to confirm the diamond is the same one as before if confirmed, they then process the diamond and insert the item in the "box/device"—the orientation of the diamond is irrelevant at this stage, they simply need to place the diamond in the "box/device".

The "box/device" now proceeds to perform the record the new mass, geometry, and take photographic images with 3D space awareness relative to the 3D geometry. The diamond is then re-oriented in virtual space, through similar techniques as described in 3D graphical rendering when taking an object from real-world space to object-world space, to align two of the imperfections (and their 3D spatial data, as well as spectral data) with the previous entry; once this done the algorithm needs to simply rotate along that axis axis until it finds an imperfection, and then finally one more rotation, until it finds a third imperfection (although this could be repeated to a higher count if needed), and a subset of the N original imperfections should sufficiently match.

If this is true, then a new blockchain entry is generated with the new details and can be appended to the blockchain entry as a "child" of the previous entry. Otherwise reject the item as a child of the previous entry These operations to physically divide an item and maintain continuity to an earlier analysed and record item (recorded via its data) can be repeated any number of times as long as three imperfections remain.

Because of the unique 3D spatial properties as well as shapes of the imperfections, they're impossible to replicate within diamonds, and other gemstones, but this could also be true for anything that has small-scale imperfections or anomalies, such as paintings whereby you have variations in the elevation of the paint, strokes of the brush, pigmentation attributes, canvas elements such as degradation, stains, and textual qualities from production, and/or time-attributed affects that simply cannot be reproduced.

Random anomalies are treated as "noise" that is unique to that item which acts as its primary verification method (for paintings: this could be the variations in the elevation of the paint, strokes of the brush, pigmentation attributes, canvas elements such as degradation, stains, and textual qualities from production, and/or time attributed affects, which may be impossible to reproduce). In cases such as gemstones, additional steps cope with the possibility that a gemstone will be cut and modified—hence the geometry mapping.

This could be integrated into newly manufactured products which if the producer of the product generates one-time unique random "noise" into their product can mean every product is uniquely identifiable or via the already randomly occurring defects, anomalies, imperfections, or variations present in all manufactured goods.

The proposed solution provides a non-invasive method or analysis as an invasive method could reduce or damage the valuation of the physical item, and could be extremely expensive, or simply implausible.

Proposed Embodiment(s)

FIG. 1 illustrates a computer network 100 showing a plurality of nodes 102, 104, 106, 108 and 110, respectively Node 1, Node 2, Node 3, Node 4 and Node 5 that communicate to provide a distributed ledger to record data for physical "real world" objects (e.g. assets) to enable provenance, traceability, privacy, security, and strong verification of transactions and blocks. It will be understood that only some of the nodes of this peer-to-peer network are illustrated.

In FIG. 1, there are several example nodes (Node 1, Node 2, . . . Node 5) enabled to communicate with each other using a Wide Area Network (WAN) such as the Internet (e.g. Internet communication is shown using an unbroken line). At least some of these nodes are located remotely from one another, preferably geographically disbursed about all or a part of the world, to enable services described herein from various locations and to provide a robust distributed peer-to-peer network. Some nodes (e.g. Node 1, Node 2 and Node 3 (102, 104 and 106)) are shown also interacting via short range communications (e.g. represented by a dashed line) as described further in the documentation. Not all nodes may need the ability to communicate via short range communications. However, all field deployed nodes (e.g. "miners") will need to have at least this ability.

There are three types of nodes: 1) miners—which are the nodes that assess an asset; 2) witnesses—which may be other miner nodes within short range communication or nodes which provide all the same functionality as an miner minus the asset assessment, to improve security and confidence in location of the miner, and 3) full nodes which are not miners or witnesses that help the network be more secure. Full nodes, which are not field deployed (unlike miner or witness nodes, which may be deployed at a gemstone mine or at an art dealer—as such are physically out in the wild) are network nodes and do not do asset assessment or location assessment, but can instead verify every block on a blockchain, its validity, its correctness, and the transaction of assets if any transactions exist. Full nodes do need to be geographically dispersed and sufficiently capable of proving their identity integrity, hardware component integrity, the integrity of any source code run on them, track every block and ensure its validity, every transaction and ensure its validity, as well as, ensure the consensus rules associated with the asset class in question—they are similar in function as bitcoin full nodes [https://en.bitcoin.it/wiki/Full_node].

Node 1 102 is a miner configured to assess assets (e.g. instances of physical items). Asset classes may include such things like gemstones, ores, mineralogy, artwork, antiquities, food, agricultural goods, crime evidence, DNA assessment, manufactured goods, and any other application of spectral imaging for analysis where the anomalies are spatially aligned in 3D space but retain relative distance, or the anomalies change at a formulaically defined rate, such as exponential growth of mould or bacteria. A particular node may be configured only to assess a particular class or type of asset. Some nodes may be enabled to assess more than one type. Assessing comprises a 3D spatial mapping to a spectral analysis, specifically looking for physical features (e.g. anomalies, defects, or imperfections which are either naturally occurring, a product of time-based degradation, textual patterns and properties, and/or human made through some process which produces unique non-reproducible randomness) that can uniquely identify an asset. Such physical features (e.g. anomalies, defects, or imperfections, etc.) may include inclusions, scratches, tears, warps, textual patterns and properties, or any other variation which is observable through a laser projector-receiver combination, photography camera and/or spectral imaging analysis. As an example of some asset types with unique features are imperfections within the 3D space of the asset, such as occlusions within a gemstone. During the assessment, Node 1 102 defines assessment data (also referenced as analysis data herein) from which the asset may be uniquely identified and its identity subsequently verified. An asset may be subsequently verified such as performing a second assessment of the asset, by a same or a different node capable of assessing the asset, and by comparing a second instance of the assessment data to the first instance and determining a match (at least within a threshold of error—which is described as $C_{asset}$ further below). Analysis data includes spectral imaging data stitched with the 3D spatial information, which captures the previously mentioned anomalies, defects, or imperfections (e.g. to define a unique signature). Node 1 102 may record the first instance of the analysis data to the distributed ledger as described further. The first instance of data may be retrieved from the ledger such as to compare with a second instance as described further.

In some applications, analysis data is recorded to the ledger in association with location data (e.g. GPS data) of the node performing the assessment (e.g. Node 1 102). Location data may be useful to identify the origin of an object such that it did not come from a sanctioned area or a conflict zone, for example, or help to ensure that the asset in question meets other guidelines specific to the asset class—such as geo-fencing of the asset, which prevents it from being traded a specified distance from its origination point. To enhance trust in the location data, assessing nodes may be configured to provide proof of location. For example, any node in the computer network that is configured to assess an asset is preferably also configured to provide proof of its location using peer-to-peer proof of location techniques. As such. Node 1 may also be known as a "prover" in this context. A prover requires at least one nearby node (e.g. Node 2 104 or Node 3 106) to be reachable via short range communication that act as "witnesses" to the prover, ensuring that the prover is indeed at the provided GPS location. Peer-to peer proof of location is further described in Blockchain for Peer-to-Peer Proof-of-Location (Brambilla, G., Amoretti, M. and Zanichelli, F., Using Blockchain for Peer-to-Peer Proof-of-Location, arXiv:1607.00174v2 [cs.DC]31 Jul. 2017) incorporated herein by reference in its entirety. As noted, Node 4 108 and Node 5 110 are nodes located outside of reach of short range communication from Node 1 102. Node 1 102 (e.g. the prover) interacts with these remote, distributed nodes 108, 110 to ensure there is consensus for node, payload, and location approval, as well as acting as a collusion counter-measure as described in Blockchain for Peer-to-Peer Proof-of-Location.

Node 1 102 records the first instance of the assessment data and (GPS) location data to the ledger. More particularly, the data to be recorded is transmitted to other nodes (e.g. 104-110) in the network 100 for consensus. This data is transmitted once Node 1 102 proves to be a valid actor and proves its available services and source code are genuine. The data to be transmitted comprises a cryptographic hash of the assessment data (e.g. spectral imaging data stitched with the spatial information—which contains the imperfection mapping). Two additional cryptographic hashes are generated and transmitted: one of the mass of the asset, and one of the GPS location. The mass data and GPS data act as meta-data elements for the block being generated. The data submission can vary with class, and type of mechanisms used. The three cryptographic hashes are included as part of the payload along with any other required items from the Blockchain Authentication and Trust Module (BATM) framework such as Node ID and reputation data as listed in "Blockchain based trust & authentication for decentralized sensor networks ∂(Moinet, A., Darties, B. and Baril, J.-L., *Blockchain based trust & authentication for decentralized sensor networks*, arXiv:1706.01730v1 [cs.CR]6 Jun. 2017)", incorporated herein by reference in its entirety, or any such framework for a decentralised trust authentication between network nodes and the proof location payloads listed in Blockchain for Peer-to-Peer Proof-of-Location. The response received from the remotely distributed nodes is then to approve, blame, or ban in the case of submission of payloads, or in the case of node registration, a response of authenticate, blame, or ban, while a renew can either receive an approval, blame or ban response; these responses and the instantiation of the associated values are for the respective actions are described in the Block Authentication and Trust Module (BATM) framework.

Figure 2:
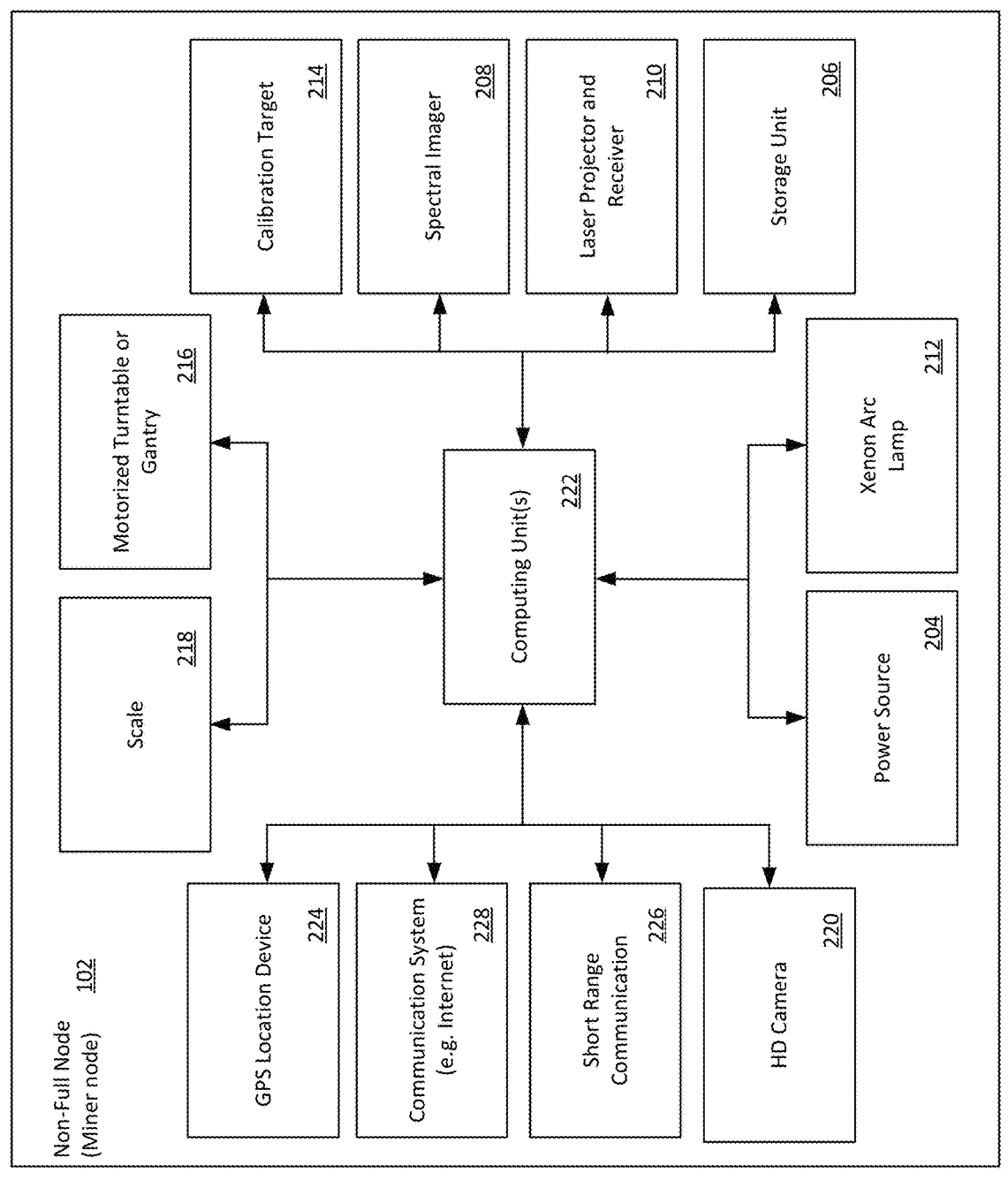
FIGS. 2-4 illustrate components of three types of nodes of FIG. 1.

FIG. 2 is a block diagram of components of a miner node (e.g. Node 1 102) in accordance with some applications.

FIG. 2 shows a baseline of components to perform its' ability to assess an asset when operating as a miner or when operating as a witness to a miner. Item assessment components may be housed in a cabinet and arranged therein to receive a physical item for assessment. Some items may be external to such a cabinet.

It will be understood that in some applications the witness may be a full node (and not a miner for example). It will be understood that a node may be configured as a witness node, which is simply a node in a mesh network configuration that acts as witnesses.

Each miner's components and functions and inter-relations are listed below:

Power source 204—a power source is required, as well as the accompanying energy to allow the node to carry out its required services to the network.

The assessment components that follow, are useful to the creation of the 3D spatial mapping to a spectral analysis which acts as a unique identifier of an asset, and used to generate the cryptographic hash of the asset itself—the self-provenance of the asset:

Storage Unit 206—a sufficiently large storage to hold the information of several assessments of the specific asset class or classes the non-full node is expected to interact with. 3D Imaging Spectroscopy is described in "3D Imaging Spectroscopy for Measuring Hyperspectral Patterns on Solid Objects" (Kim, M., Harvey, T., Kittle, D., Rushmeier, H., Dorsey, J., Prum, R., Brady, D. 2012. 3*D Imaging Spectroscopy for Measuring* 3*D Hyperspectral Patterns on Solid Objects*. ACM Trans. Graph. 31 4, Article 38 (July 2012), incorporated herein by reference)

Spectral imager 208 (spectroradiometer) assesses the asset's spectral hypercube data, identifying irregularities in composition of the asset, notably the radiometric measurements at various spatial frequencies. Such measurements are as described in the paper 3*D Imaging Spectroscopy for Measuring Hyperspectral Patterns on Solid Objects*.

Laser projector and laser receiver 210 (laser range scanner) assesses the 3D spatial data of the object, and geometric irregularities (which may include items such as inclusions in gemstones). Such measurements are also described in the paper 3*D Imaging Spectroscopy for Measuring Hyperspectral Patterns on Solid Objects*.

Xenon light source 212 provides broad spectrum (flat and uniform) illumination on the asset as described in the paper 3*D Imaging Spectroscopy for Measuring Hyperspectral Patterns on Solid Objects*.

A calibration target 214 is useful to determine the geometric relationship between the range scanner and the imager as described in the paper 3*D Imaging Spectroscopy for Measuring Hyperspectral Patterns on Solid Objects*.

A motorized turntable or gantry 216 provides a mechanism of movement (motorized base which an asset may be placed on, or a gantry which allows the movement of the 3DIS system described in 3*D Imaging Spectroscopy for Measuring Hyperspectral Patterns on Solid Objects*, for large assets)—this allows a 360-degree rotation around the specified asset.

A scale 218 to determine a mass of the article (optional).

An HD photography camera 220, for assets (such as gemstones) whose imperfections can't be mapped through the 3DIS alone.

Computing unit(s) 222 provide a processing device or devices which work to perform the 3D spatial and spectral information quickly to circumvent the high compute time required per asset scan, which will be used for the asset assessment such as described in the paper 3*D Imaging*

*Spectroscopy for Measuring Hyperspectral Patterns on Solid Objects*. Processing devices may be programmable such as via software (instructions stored in a memory for example) including a Central Processing Unit (CPU) or Graphics Processing Unit (GPU) or specially configured hardware devices such as Application Specific Integrated Circuits (ASICs) & Field Programmable Gate Arrays (FP-GAs) or combinations of same. Application Specific Integrated Circuits (ASICs) & Programmable Gate Arrays (PGAs) may be configured to perform specific (dedicated) tasks in a manner that is more efficient and takes less time than a conventionally programmed device.

The components that follow, are useful to the meta-data location tracking of an asset which acts as a method of traceability of the asset: Location based services (LBS) device (such as a GPS tracker 224)—allows for the transmission of geolocation data (GPS data) as described in *Blockchain for Peer-to-Peer Proof-of-Location*. Short range communication component 226 (such as Bluetooth, Bluetooth SMART or ZigBee, Wi-Fi Direct or any other short range network communication mechanism), which will periodically transmit proof-of-location requests and responses as described in *Blockchain for Peer-to-Peer Proof-of-Location*. Communication system 228 provides Wide Area Network—WAN communication such as network communication capabilities—a method of communicating over long distances via Internet communications to communicate with other nodes as described in *Blockchain for Peer-to-Peer Proof-of-Location*. Communication system 228 may comprise one or more antennas and one or more wired connections maybe provided to give communication abilities via short range communications and internet (WAN) communications.

The following describes how to designate the reputation and provenance of the node. As noted previously, nodes may provide at least the following at some stage of its interaction with other nodes as part of the registration, authentication, trust evaluation, component registration & validation, available services registration & validation, and resources provider validation:

Proof of identity: is discussed in *Blockchain based trust & authentication for decentralized sensor networks*, section 3. In brief, BATM associates cryptographic keys with each Network Node (NN)—e.g. a miner, witness node, or full-node, and Available Services (AS) in the network. We use the idea contained in the Pretty Good Privacy (PGP) model of a master key to identify a NN or AS among its lifespan. This key is only used to generate secondary keys for encryption and digital signature. As in most Public Key Infrastructures (PKI), private keys are the main component of the system, and so key management is particularly critical. An attacker can easily spoof Network Node (NN) identity if he retrieves its keys. NN is itself composed of two vectors, Node Properties (NP) which contains a "name" value, and all hardware devices associated which do not provide distinct abilities, e.g. power, Central Processing Unit (CPU)/Graphics Processing Unit (GPU)/Application Specific Integrated Circuit (ASIC)/Field Programmable Gate Array (FPGA)), and Node Abilities (NA) which is listed as vector of abilities described below.

Vector of abilities: is discussed in *Blockchain based trust & authentication for decentralized sensor networks*, section 3. Labelled as Node Abilities (NA) in the paper, the vector of abilities are the physical sensor abilities associated with a node. In the context of the patent, it references items such as a spectral imager, 3D scanner/LIDAR, GPS (in the sense it's stating it has global positioning system required electronics), Bluetooth (or whatever mechanism of short range communication is used), storage, and network based communication (in the sense of long range network communication) for miner nodes, while witness nodes and full-nodes could contain GPS (in the sense it's stating it has global positioning system required electronics), Bluetooth (or whatever mechanism of short range communication is used), storage, and network based communication (in the sense of long range network communication).

Vector of available services: As discussed in *Blockchain based trust & authentication for decentralized sensor networks*, section 3. Available Services (AS) defines an Abilities Dependencies (AD) vector, a Resources Dependencies (RD) vector and a Resources Provider (RP) vector. Each node stores services in a Service Registry (SR). Nodes having the storage ability can store services they cannot deploy to ensure reuse of these services in the future on other nodes. The Available Services (AS) if broken down into its 3 component vectors is as follows: Abilities Dependencies (AD), whose contents should be identical to the vector of abilities described above, Resources Dependencies (RD) described below, and Resources Provider (RP) also described below.

Any dependencies (such as non-full node witness data): is discussed in *Blockchain based trust & authentication for decentralized sensor networks*, section 3. Resources Dependencies (RD) vector may be comprised of any remote resource dependencies for the node, which may include Bluetooth (or whatever mechanism of short range communication is used), and GPS which is associated with the witness nodes in range, and Resources Provider (RP) which may contain elements such as a datacube from the spectral imager, GPS location from the GPS and witnesses for the miner node, GPS and witnesses for the witness node, and transaction/anomaly lookup, GPS location from the GPS and witnesses for the full-node.

Peer-to-Peer Proof-of-Location comprise Resources Provider (RP) elements of GPS location as well as witnesses with their respective GPS location payloads.

Resources provider vector: is discussed in *Blockchain based trust & authentication for decentralized sensor networks*, section 3. Resources Provider (RP) comprise elements such as a datacube for the spectral imager, GPS location from the GPS and witnesses for the miner node, GPS and witnesses for the witness node, and transaction/anomaly lookup, GPS location from the GPS and witnesses for the full-node.

The incentive of node validation is to ensure the reputation of the node itself, while the incentive of abilities and services validation to ensure reputation of the abilities a node states it provides as well as the resources it provides as discussed in *Blockchain based trust & authentication for decentralized sensor networks*, section 4. This could include payloads contained in the blockchain as an indication of each node's behaviour on the network over time. This approach seeks to ensure a node cannot fool others by tampering data or pretending to be someone else. Thus, reliability of trust evaluation is ensured without the need of a trust center. The reputational assessment is targeted at the Network Node (NN) trust evaluation level, but the same principles apply to Available Services (AS), with the particularity that Available Services (AS) reputation level is echoed on each node in the network, thus modifying reputation level on each node using it. As such when a network node is validated, based on its private keys, which we state must be kept secure, as well as Node Properties (NP) and Node Abilities (NA) which is the vector of abilities [48], we can be sure it is the node it claims to be with the appropriate abilities via Available Services (AS). Available Services (AS) also relies on the same private key, which comprises of the Abilities Dependencies (AD), Resources Dependencies (RD), and Resources Provider (RP), with Abilities Dependencies (AD) having a one to one mapping to Node Abilities (NA) which is the vector of abilities [48] are truly from that same node, with the same private key, which made it and prove the node's capacity in a tamper proof way.

Operation in this manner provides a measure of trust that a node does what it is intended to do, based on its reputation over time through the payloads it provides and interactions with other nodes.

Additionally, location based meta-data must be added as it may be useful to identify the origin of an object such that it did not come from a sanctioned area or a conflict zone, for example, or help to ensure that the asset in question meets other guidelines specific to the asset class—such as geofencing of the asset, which prevents it from being traded a specified distance from its origination point.

As such a base dependency vector includes that at least one reputable witness, whereby reputation is based on the BATM reputation previously mentioned, and which also meet the criteria outlined in sections 4.1 to 4.4 of *Blockchain for Peer-to-Peer Proof-of-Location*.

This sufficiently ensures the location tracking of an asset where required, in the use of producing the cryptographic hash of the meta-data of the location.

Finally, nodes provide a digital signature of the source code which is executed, much in the same way that the BATM framework uses a digital signature to provide authentication/verification of the node, only this is applied to the source code, which can be viewed as a service provided.

The assessment components may be configured to assess the particular features of an asset, whose features may depend upon the type/class of the asset. The compute units may be configured accordingly with workflow, etc. to obtain the desired assessment data responsive to the asset type with which to generate unique signatures as described. User instructions may be provided to assist with the analysis operations.

Figure 3:
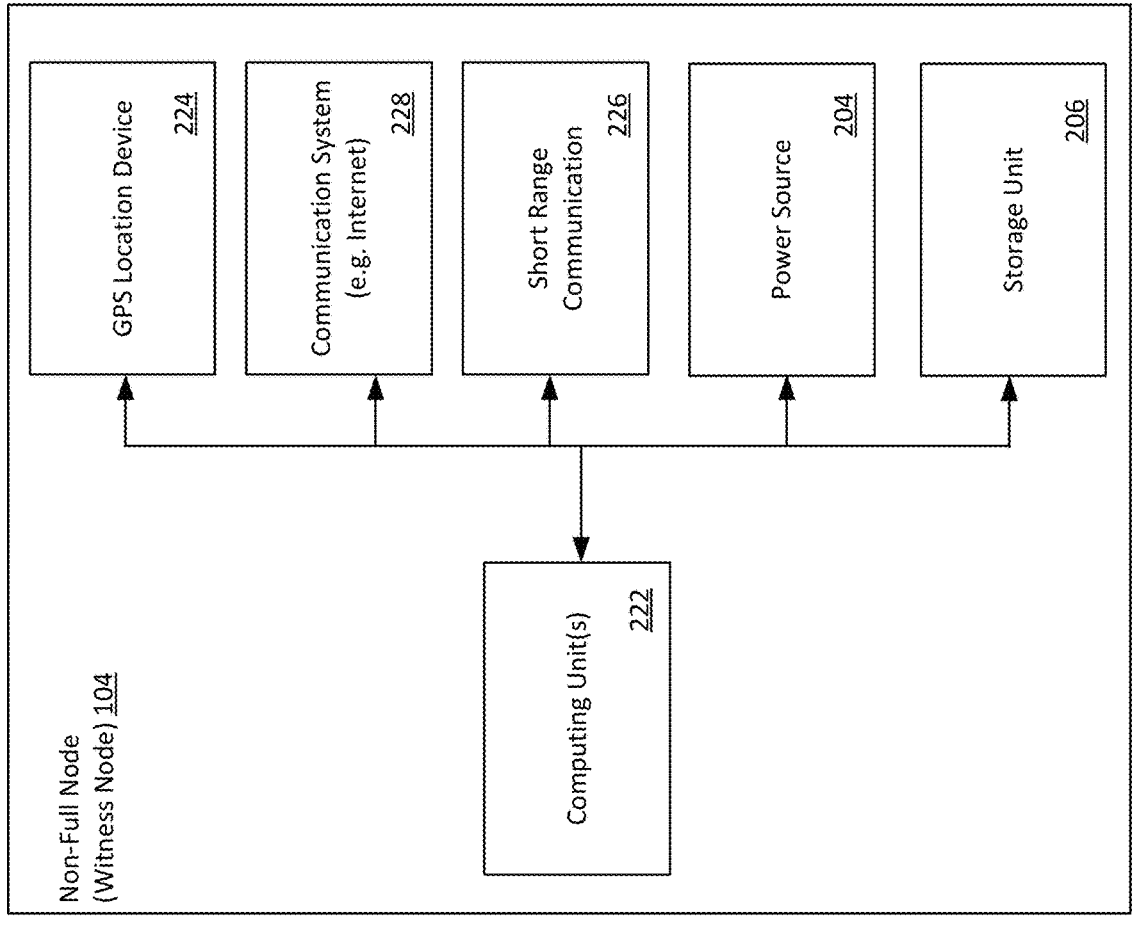

FIG. 3 is a block diagram of a witness node such as Node 2 104, which is not a miner, in accordance with some applications. FIG. 3 shows a baseline of components to perform its' ability to act as a witness to miners or other witnesses. From a high level, the components shown are the same as like components of FIG. 2 though the computing units, may be configured for witness roles. There is a power source 204, storage unit 206, computing units 222, GPS location device 224, short range communication system 226 and a communication system 228 for wider communication such as the internet.

As noted, Computing unit(s) 222 provide a processing device or devices (including CPU, GPU, ASICs, FPGAs etc.) which work to perform the calculations relating to payloads required for node identification, node component identification and integrity and available services identification and integrity, as well as the BATM framework—*Blockchain based trust & authentication for decentralized sensor networks*, section 3 and section 4.

The following describes how to designate the reputation and provenance of the witness which provides location based verification based on proximity and therefore traceability.

As noted previously, nodes may provide at least the following at some stage of its interaction with other nodes as part of the registration, authentication, trust evaluation, component registration and validation, available Services Registry (SR) and validation, and Resources Provider (RP) validation: Proof of identity; Vector of abilities; Node Abilities (NA)—listed as vector of available services; Any dependencies (such as non-full node witness data); Resources provider (RP) vector; as well as Peer-to-Peer Proof-of-Location. The incentive of a node validation is to ensure the reputation of the Network Node (NN) itself, while the incentive of Available Services (AS) validation to ensure reputation of the abilities a node states it provides as well as the resources it provides as discussed in *Blockchain based trust & authentication for decentralized sensor networks*, section 4.

Operation in this manner provides a measure of trust that a node does what it is intended to do, based on its reputation over time through the payloads it provides and interactions with other nodes.

Additionally, location based meta-data is added as it may be useful to identify the origin of an object such that it did not come from a sanctioned area or a conflict zone, for example, or help to ensure that the asset in question meets other guidelines specific to the asset class—such as geofencing of the asset, which prevents it from being traded a specified distance from its origination point. As such a base dependency vector includes that at least one reputable witness, whereby reputation is based on the BATM reputation previously mentioned, and which also meet the criteria outlined in sections 4.1 to 4.4 of *Blockchain for Peer-to-Peer Proof-of-Location*. This sufficiently ensures the location tracking of an asset where required, in the use of producing the cryptographic hash of the meta-data of the location.

Finally (and similarly), witness nodes provide digital signature of the source code which is executed, much in the same way that the BATM framework uses digital signature to provide authentication/verification of the node, only this is applied to the source code, which can be viewed as a service provided.

Figure 4:
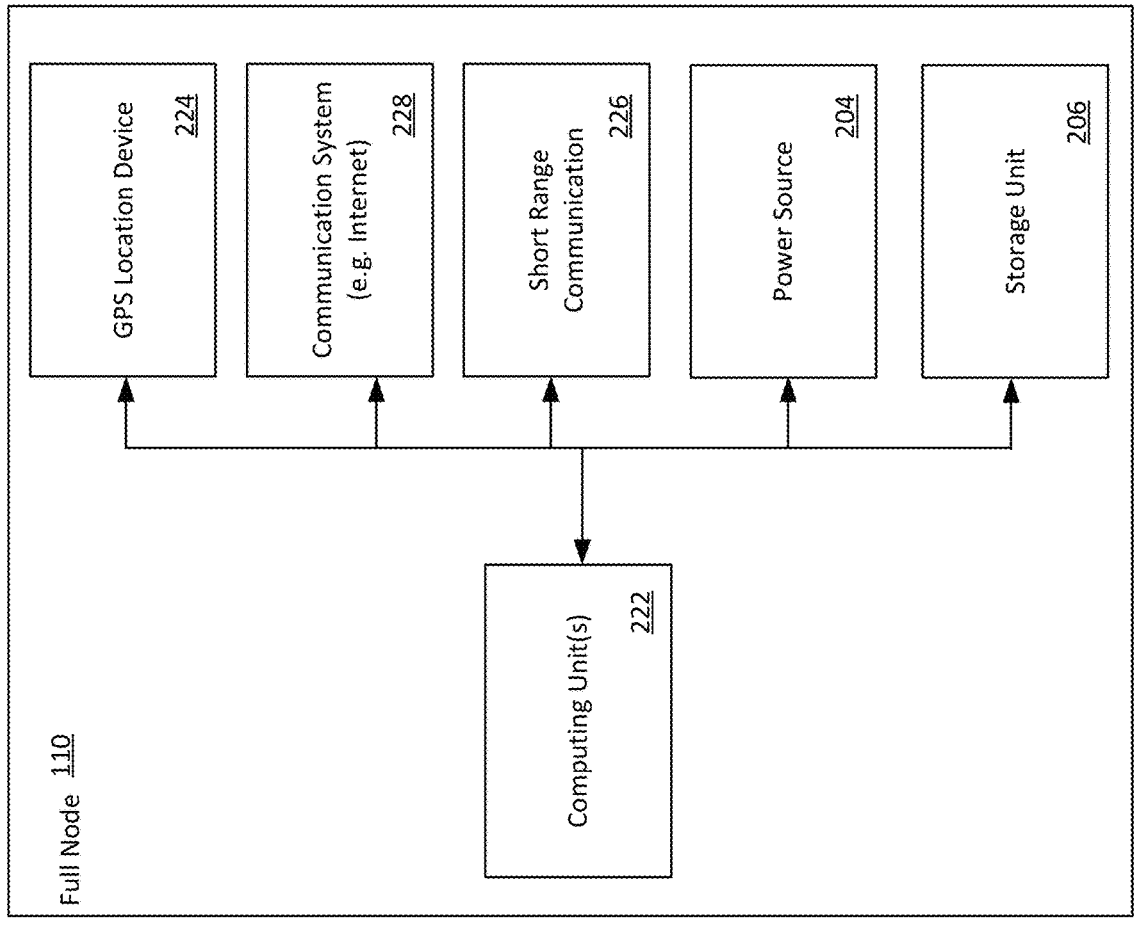

FIG. 4 is a block diagram illustrating a full node (e.g. Node 5 110), which is not a miner or witness, in accordance with some applications and must rely minimally on miners or witnesses, they are there to ensure blocks validity, provide historical archiving, and enforce consensus rules. FIG. 4 shows a baseline of components to perform its' ability to act as a witness to miners or other witnesses. From a high level, the components shown are the same as or similar to like numbered components of FIG. 2 though the computing units 222 are configured for full node roles. There is a power source 204, storage unit 206, computing units 222, GPS location device 224, short range communication system 226 and a communication system 228 for wider communication such as the internet. Storage unit 206 in the present instance is an extremely large storage to hold the information of all transactions and blocks on a blockchain, typically in the terabytes or higher size, as these nodes are what can be used by institutions to potentially hold their digital wallets. Such storage stores a history of all blocks that have occurred for its associated asset(s) that are assessed by the miners that communicate with it.

Below is a description of a process to perform asset checking, minting (e.g. meaning a first recording of the asset to the blockchain), and modified asset branching (where an asset like a gemstone may be cut into more than one stone but have sufficient signature properties to link to a prior recorded asset). The description relates to evaluation of unique signatures, namely a signature generated for an instance of a physical item and a pre-recorded signature.

Other features may be optionally evaluated too such as asset type, mass, etc., depending, for example, on the data stored to the blockchain for each asset. Some blockchains may only store assets of a particular type such that asset type is not of value. Some asset types may not require a value for mass or HD photography as such they are optional for some asset classes, however spectral imaging and 3D scans are always required. It should also be noted that there's a constant, which is specific to an asset class or defined by the exponential growth or decay formula, which is denoted by $C_{asset}$, which can be added to each $X_n'$, $Y_n'$, and $Z_l'$ to allow for acceptable threshold. $C_{asset}$ can vary according to stability of anomaly over time e.g. a crystalline structure such as a diamond has stable anomalies if they reside below surface level of the gem, as such the tolerance may be extremely small compared an asset which experiences decay or growth which is an instability based on time. Additionally, surface level anomalies are much more susceptible to variation, as such the relative depth from surface is a consideration considered for $C_{asset}$ calculation. Regarding virtual re-orientation, the delta space is technically infinite in nature if the anomaly is something as simple as a sphere, as you could technically re-orient the virtual instance of such anomaly in every possible position along the X, Y, and Z axes, however in an enormous amount of the use cases, this is unlikely as most shapes are not perfectly symmetrical on all axes—one may use a 3D shape complexity measure, such as described by D. Wang et al., in *Shape Complexity from Image Similarity*, Max-Planck-Institute For Informatics, MPI-I-2008-4-2 Oct. 2008 which is incorporated herein by reference in its entirety (https://pdfs.semanticscholar.org/ef17/1242043e52f2ade49e0b1ba6f0a7d179c676.pdf [pdfs.semanticscholar.org]) which identify the most complicated shape, and the most complex shapes (anomalies) may be explored first, as they limit the search space substantially for the 2nd and 3rd candidate anomalies and as a result the overall search time and number of payloads submitted, and network traffic used.

b. If no match is found and search space is exhausted, then the asset is unique
   i. Miner creates from $X_n$ all possible $Y_m$ and $Z_l$
   ii. Miner sends $Z_l$ to full-nodes to ensure there is no clash for any of the triplet of points as well as for verification, confirmation, and acceptance in accordance to the BATM framework as well as the LBS framework
      a) If verification, confirmation, and acceptance are agreed upon, asset is minted.
      b) Else provide adequate information back—this indicates that the payload is not valid, confirmation is not reputable, or the asset can't be accepted due to an asset having at least one identical triplet, in another full node's wallet
c. If match, then miner proceed to step 4, with the candidate $X_{n'}$
4. For each $X_n-1$, miner creates a hash map which excludes $X_{n'}$ to create a hash map for all $Y_m$ where $X_{n'}$ retains its orientation requirements, and checks with a full node to see if there exists an equivalent value in the blockchain
   a. If no match is found and search space is not exhausted
      i. Miner create as many virtual instances as the miner can search simultaneously
      ii. Miner begin virtual re-orientation along the axis of $X_{n'}$ which allows it to retain proper orientation, through world to object space mapping, and the miner creates a hash for each newly possible $Y_m$.
      iii. Repeat step 4
   b. If no match is found and search space exhausted, then the asset is unique
      i. Miner creates $Z_l$ which the miner creates from $X_n$, excluding $X_{n'}$, all possible $Y_m$ and $Z_l$, which maintains $X_{n'}$ orientation requirements
      ii. Miner sends $Z_l$ to full-nodes to ensure there is no clash for any of the triplet of points as well as for

TABLE 1

| Nomenclature | | |
|---|---|---|
| $X_n$ Non-repetitive possible 1D anomaly mappings | $X_{n'}$ Candidate 1D anomaly mapping | $X_{n_c}$ A confirmed 1D anomaly mapping to a blockchain block |
| $Y_m$ Non-repetitive possible 2D anomaly mappings | $Y_{m'}$ Candidate 2D anomaly mappings (composed of $X_{n'}$ as well as another point) | $Y_{m_b}$ A confirmed 2D anomaly mapping to a blockchain block |
| $Z_l$ Non-repetitive possible 3D anomaly mappings | $Z_{l'}$ Candidate 3D anomaly mappings (composed of $Y_{m'}$ as well as another point) | $Z_{l_a}$ A confirmed 3D anomaly mapping to a blockchain block |

Figure 5:
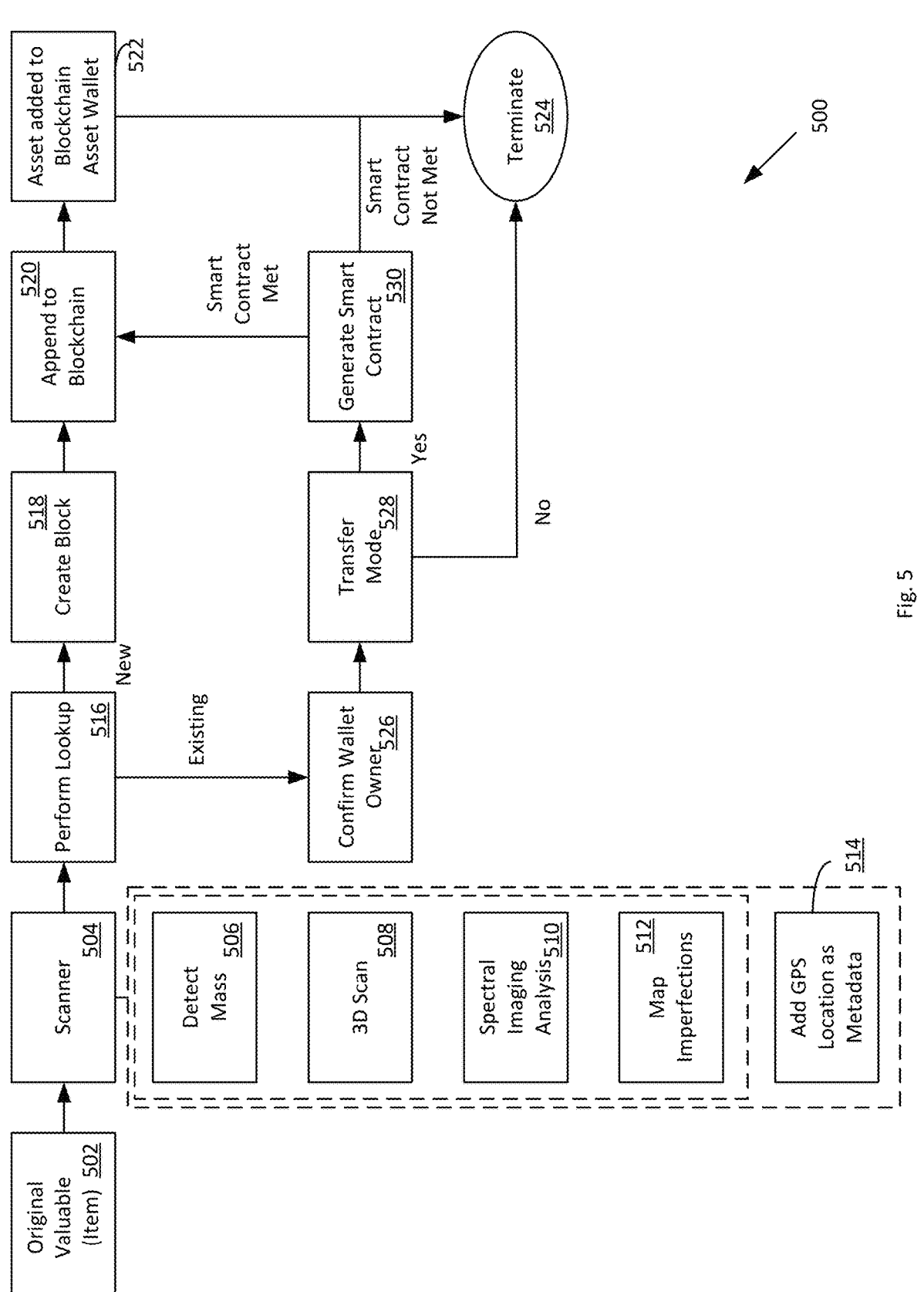
FIGS. 5, 6, and 7A-7C illustrate operations of the nodes related to example use cases in accordance with respective embodiments.
Figure 6:
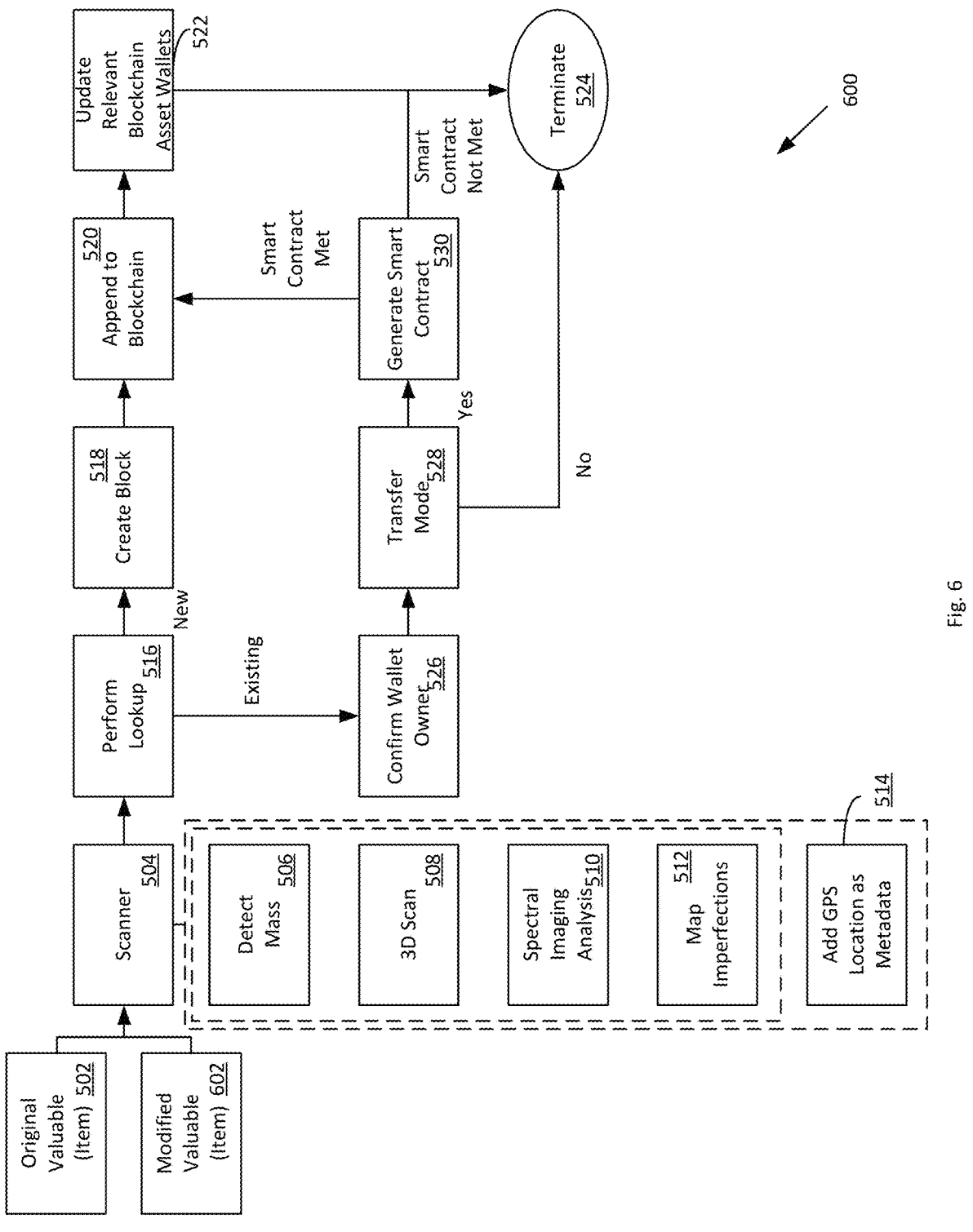

1. Miner creates $X_n$ for a scanned asset
2. Miner creates a hash map for all $X_n$ (it is understood that other search methods and structures may be used)
3. For each K miner checks with a full node to see if there exists an equivalent value in the blockchain
   a. If no match is found and search space is not exhausted
      i. Miner creates as many virtual instances as the miner can search simultaneously
      ii. Miner begins virtual re-orientation through world to object space mapping, and creates a hash for each possibility.
      iii. Repeat step 3 verification, confirmation, and acceptance in accordance to the BATM framework as well as the LBS framework
   a) If verification, confirmation, and acceptance are agreed upon, asset is minted.
   b) Else provide adequate information back—to indicate that the payload is not valid, confirmation is not reputable, or the asset can't be accepted due to an asset having at least one identical triplet, in another full node's wallet.
c. If match, then miner proceeds to step 5, with the candidate $Y_{m'}$
5. For each $X_n-2$, create a hash map which excludes $Y_{m'}$ to create a hash map for all $Z_l$ where $Y_{m'}$ retains its orientation requirements, and check to see if there exists an equivalent value in the blockchain a. If no match is found and search space is not exhausted
 i. Miner creates as many virtual instances as the node can search simultaneously
 ii. Miner begins virtual re-orientation along the axes of $Y_{m'}$ which allows it to retain proper orientation, through world to object space mapping, and the miner creates a hash for each newly possible $Z_l$.
 iii. Repeat step 5
b. If no match is found and search space is exhausted, then the asset is unique
 i. Miner sends $Z_1$ which the miner creates from $X_n$ excluding $Y_{m'}$ which contains $X_{n'}$, all possible $Z_l$, which maintains $Y_{m'}$ orientation requirements
 ii. Miner sends $Z_l$ to full-nodes to ensure there is no clash for any of the triplet of points as well as for verification, confirmation, and acceptance
  a) If verification, confirmation, and acceptance are agreed upon, asset is minted.
  b) Else provide adequate information back—to indicate that the payload is not valid, confirmation is not reputable, or the asset can't be accepted due to an asset having at least one identical triplet, in another full node's wallet.
c. If match, then terminate, as we have found a previously existing asset which must have $Z_{l_q}$ as the triplet of points (composed of $Y_{m_b}$+a third value, and likewise $Y_{m_b}$ must contain $X_{n_a}$ plus a second value).
 i. Miner sends data to full-nodes to check if all $Z_l$ hash maps which conform to the $Z_{l_q}$ orientations, match and in accordance to the BATM framework as well as the LBS framework
  a) If yes, the asset is the asset stored in the previous blockchain entry
  b) If no, then the asset is a child of the previous blockchain entry, and can be branched accordingly
 ii. Miner sends Zito full-nodes for verification, confirmation, and acceptance in accordance to the BATM framework as well as the LBS framework
  a) If verification, confirmation, and acceptance are agreed upon, asset is confirmed to be legitimate.
  b) Else provide adequate information back—to indicate that the payload is not valid, confirmation is not reputable, and someone is attempting a malicious event FIGS. 5-7 illustrate use cases to record information on the blockchain and/or determine information from the blockchain. In accordance with the illustrated embodiments, through public and private key cryptography used by the blockchain, wallets may be used to store keys for use to access and authorize transactions against the data in the blockchain. Wallets may take different forms including hardware wallets, as is well-known.

In some uses cases, new assets are recorded to the blockchain and wallets of associated owners of the assets are updated. In some cases an existing asset is already recorded to the blockchain. In some cases the physical asset has undergone modification but may still present with a sufficient signature to provide a manner to trace the asset on the blockchain and maintain blockchain data for any transfer, for example.

Operations in any of these cases may look up whether asset is recorded. If not, operations may in some cases perform to record the asset as described. If the asset is recorded previously, operations may perform to determine whether a transfer or other action is to be performed. A transfer may associate the asset with a different wallet (i.e. record the data in association with the key(s) of another wallet (recipient's wallet)).

In some embodiments, transfers may be implemented using a smart contract, for example, to trigger a transfer on the proof of a certain event or events. One such event may be the payment of a cryptocurrency. If the smart contract term(s) is/are fulfilled and the contract is met, a new block may be created accordingly as described herein. The blockchain may associate the asset with a new (public) key of the recipient. An update to a wallet may involve a reading of blockchain data by the wallet using the key(s) associated therewith to see what data is stored on the blockchain.

FIG. 5 is a flow diagram showing a flow of operations 500 with certain components and outputs for a general asset use case from a source of the original asset or valuable (e.g. an instance of a specific asset or valuable, sometimes referenced as an item 502). Item 502 is obtained and provided to a scanner 504. Scanner 504 may be defined from assessment components of a miner node such as Node 1 102. Such assessment components may comprise a scale 218, HD camera 220, xenon arc lamp 212, hyperspectral camera 208, laser projector/receiver 210, etc. Operations of Node 1 102 (e.g. scanner 504), using these respective components (as well as others) of Node 1 such as computing unit(s) 222, storage unit 206, etc. turntable or gantry 216, etc.) perform to: detect mass 506, define a 3D scan 508, define a spectral image analysis 510 and map imperfections 512. Respective data for these operations is created as described earlier herein. GPS data for Node 1 may be determined 514.

The imperfections data (e.g. analysis data defining the unique signature), etc. such as for searching and/or recording to a block of a block chain is signed and a hash thereof defined (e.g. for authenticity, etc.). A look-up against blockchain data is performed (at 516) to determine if the asset is previously recorded. The anomalies (e.g. unique signature) are searched and a result returned from the blockchain indicating whether the item is found or not, etc. other data may also be returned such as recorded owner related data.

If the item is not found, then the item is new and not recorded to the blockchain previously. Via the "New" branch, operations proceed at 518 to define a transaction to add the new item to the blockchain (e.g. create a block). It is understood that the transaction is not processed by the node performing operations 500 per se but by the distributed nodes maintaining the blockchain. At 520 operations append the block to the blockchain (e.g. by the distributed nodes maintaining the blockchain). A confirmation maybe determined by the node performing operations 500 that the asset is added. At 522 the asset is added to a blockchain asset wallet (confirmation of the transaction) and operations terminate (524).

If, at 516, the item is found on the blockchain, the item is not new/original but one that has already been processed. Operations 500 may terminate (not shown), for example, because the lookup was intended to confirm a prior recording (a verification). However a transaction may be desired. By way of example, it may be desired to transfer ownership of the asset from a current owner. Operations at 526 determine and verify current owner information such as by use of private keys, etc. and by using ownership data from operations 516. Appropriate data may be provided to a user (e.g. look up data) not shown. If at 528 a transfer mode is not possible (e.g. not a verified owner, etc.) then via "No" branch, operations terminate at 524. If a transfer mode is possible, via "Yes" branch at 528, a smart contract may be defined (at 530) to perform the transfer. Operations here may also involve nodes of the blockchain for example to verify the smart contract, add it to the blockchain for processing, etc. Verification of transferor and transferee and a further verification of the asset/item may be further undertaken. Verification of the asset can comprise performing a 3D scan and spectral analysis to determine analysis data with which a unique signature is defined and performing a look up of that signature to confirm the specific asset is recorded to the blockchain. If the smart contract is not met, operations terminate at 524. If the smart contract is met, via the related branch, the appropriate ledger changes are written to a new block on the chain making the transfer (by the blockchain nodes) at 520, the asset is added to the transferee wallet, removed from transferor wallet (e.g. at 522) and operations terminate. As noted some operations described may not be performed by Node 1 per se but by devices with which it communicates, directly or indirectly on its behalf/request.

FIG. 6 is a flow diagram showing a flow of operations 600 with certain components and outputs for a general asset use case for an asset received from an intermediary. The asset may be an original item 500 or a modified item 602 (e.g. a portion of the original). Operations 600 comprise operations that are similar to like numbered operations of FIG. 5 with changes as shown. It is understood that these operations, particularly operations 518 may differ when they are performed in relation to a modified item. Looking up a modified item may require different matching considerations as previously described. Operations 522 may relate to respective block chain wallets of transferor and transferee as described.

Figure 7A:
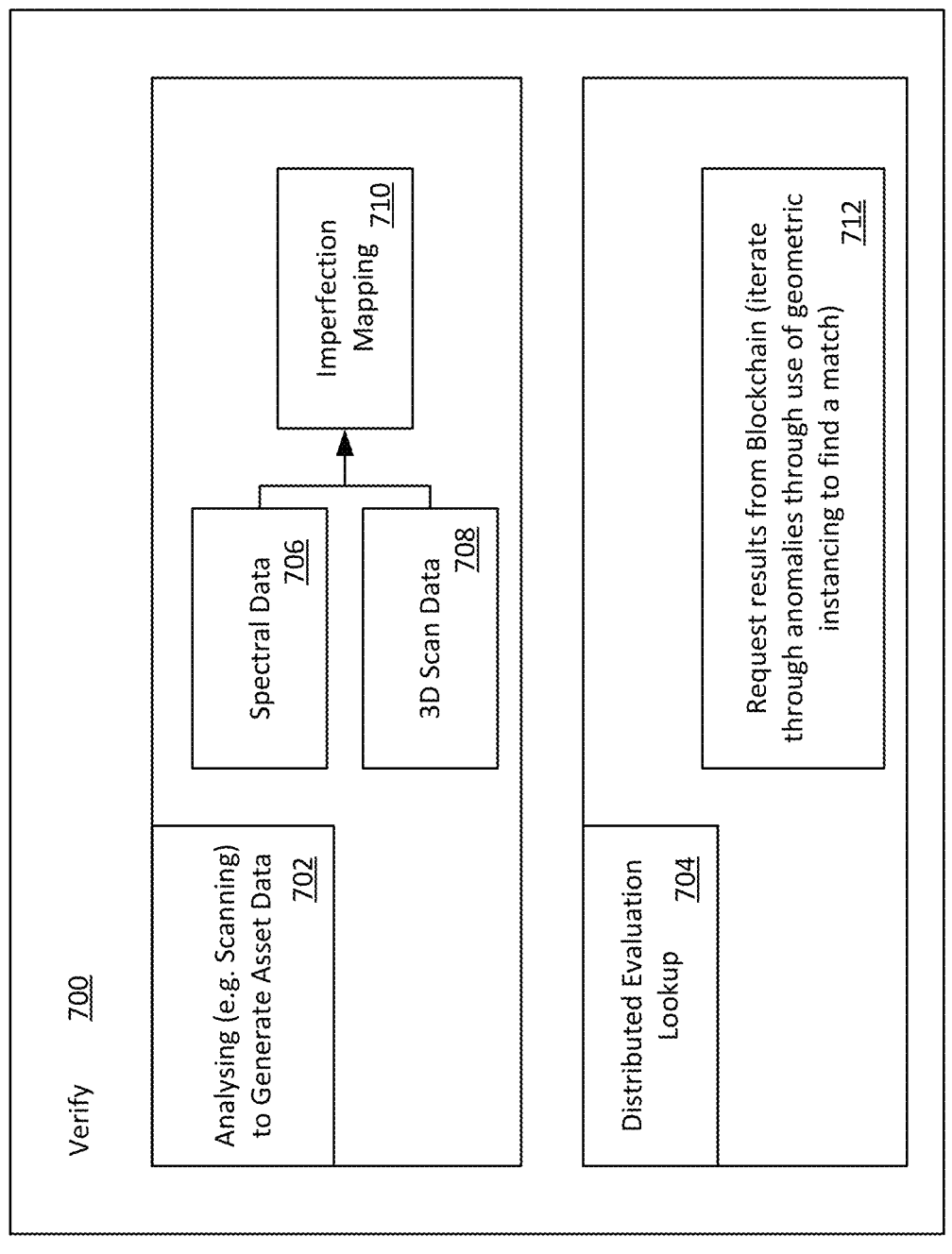
Figure 7B:
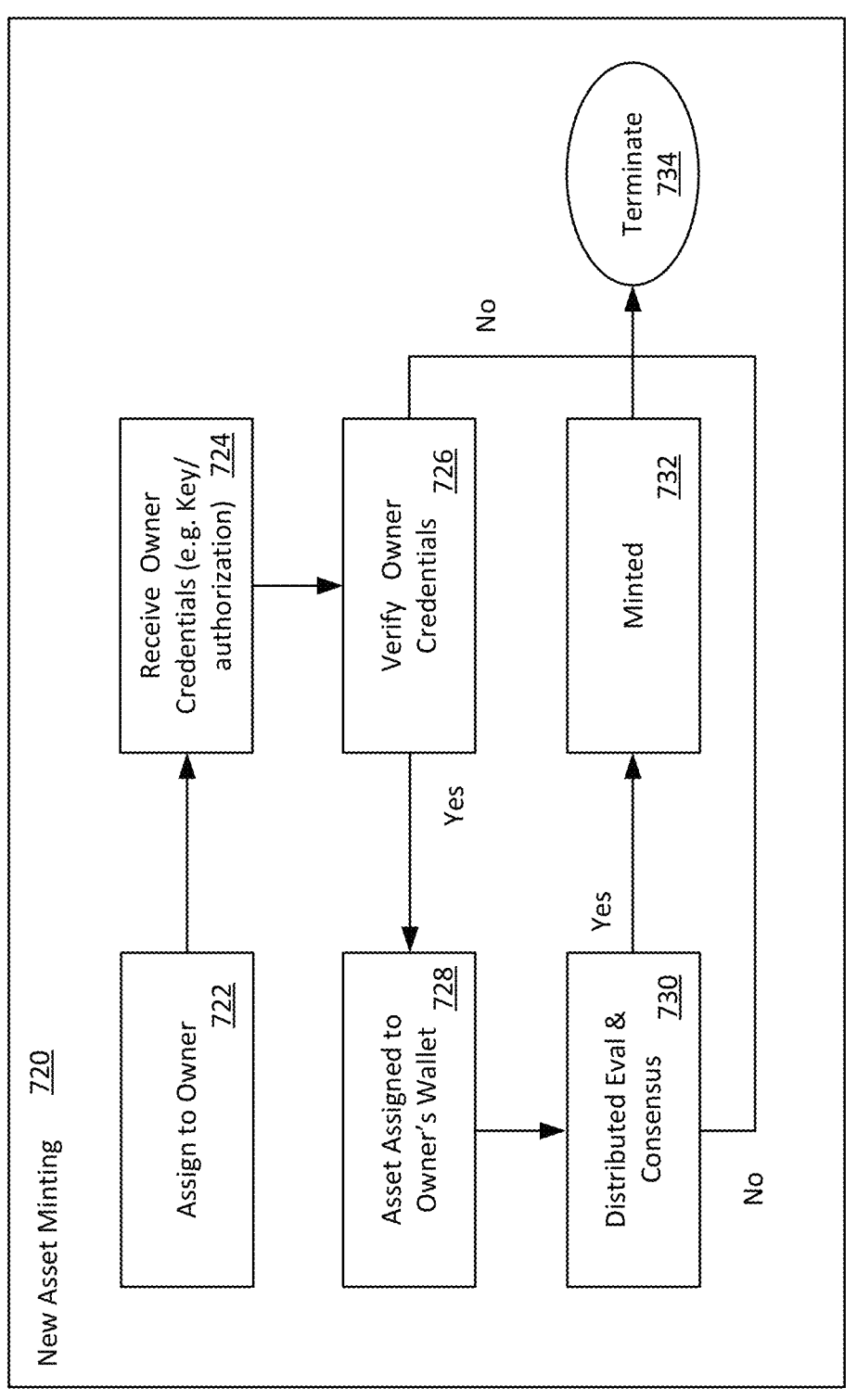
Figure 7C:
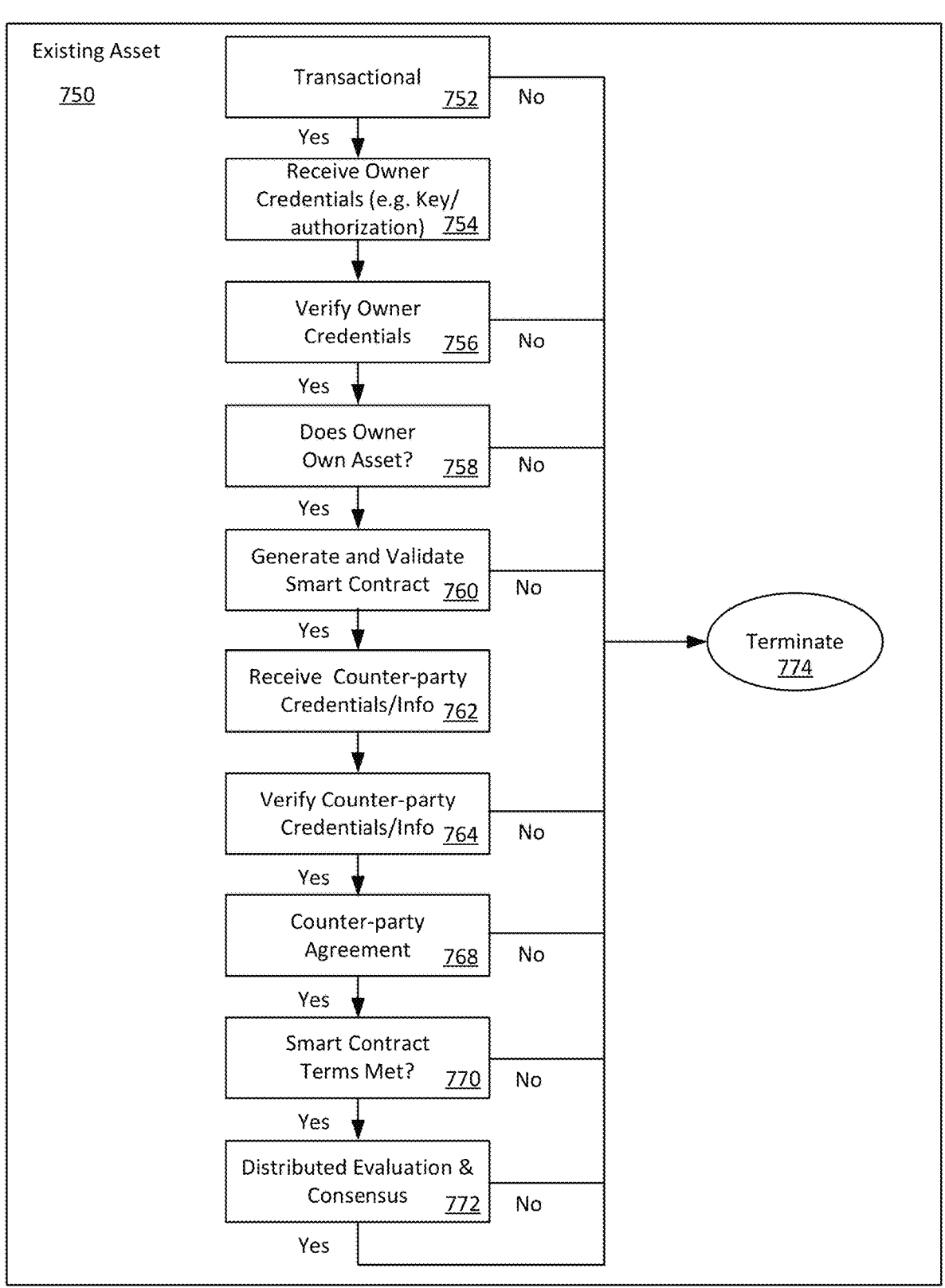

FIGS. 7A-7C are flow diagrams showing operations 700, 720 and 750 having similarities that will be apparent to operations 500 and 600 but provide more detail. With reference to FIG. 7A there is a verify operation 700 which determines whether an asset/item is previously recorded to the blockchain. That is whether the asset/item is new or an existing item. Verify operations 700A may be invoked to receive a response indicating new or existing. Verify operations 700 have two components, namely an analysing (e.g. scanning) component 702 to generate asset data for an asset/item and a component to determine, via a distributed evaluation lookup 704 whether the asset data is previously recorded to the blockchain. Asset data from analysing an asset various by asset class such as previously described and comprises spectral data 706 and 3D scan data 708 that is combined to produce imperfection mapping to describe the anomalies, which in turn are used to define the unique signature for the asset. This data 710 (among others as described) is provided to perform a lookup on the blockchain. The lookup (at 712) requests results from the blockchain invoking such nodes to perform an iterative evaluation of the anomalies through the use of geometric instancing to find a match to the unique signature as described. Responses from the blockchain may include an indication that the asset is an existing asset or a new asset. Operations responsive to these respective lookup results are described with reference to FIGS. 7B and 7C.

With ref. to FIG. 7B there is shown new asset minting operations 720. At 722 the asset is to be assigned to a new owner (e.g. a transaction defined therefor). Owner credentials are received at 724 (e.g. key information, authorization, signing). At 726, credentials are verified. If verified, via "Yes" branch operations proceed to 728 where the asset is assigned to the owner's wallet. At 730 a request is made to the blockchain to evaluate the new recording in association with the owner (effectively process the transaction). If successful, via "Yes" branch from 730, the new asset is minted (e.g. at 732) and operations terminate at 734. If not successful, operations terminate via "No" branch from 730. If owner credentials are not verified, via "No" branch from 726, operations terminate at 734.

With ref. to FIG. 7C there is shown existing asset operations 750. At 752 if operations are transactional, such as to transfer an existing asset, via "Yes" branch to 754 operations proceed. Otherwise, a lookup (e.g. using verify operations 700) was performed such as to confirm recorded information. If so, operations branch via "No" branch to terminate at 774. At 754 operations receive owner credentials for verification (e.g. key information, authorization, signing, etc.) and at 756 verify same. If not verified, via "No" branch, operations terminate at 774. If verified, via "Yes" branch to 758 operations then determine if the owner is the owner of the asset on the blockchain. Owner information may have been received using verify operations 700 or via a different lookup (not shown) such information may be obtained. If ownership is not verified, operations terminate via "No" branch to 774. If verified, operations proceed via "Yes" branch to 760 where a smart contract is generated and validated. Generation may comprise writing a smart contract (transaction) and validation may comprise sending the smart contract for review and validation to the blockchain where various checks may be performed (ownership confirmation, etc.) and the contract added to the blockchain. If not validated, operations terminate via "No" branch to 774. If validated, operations may receive counter-party credential and information (e.g. wallet information) at 762. At 764, such is verified and if unsuccessful, operations terminate (via "No" branch to 774).

If successfully verified, counter party agreement (e.g. signing) is received at 768. If not, operations terminate (via "No" branch to 774). If yes, operations proceed to 770. Here the terms of the smart contract are evaluated to see whether the terms are met. Verify operations 700 are performed to confirm the asset. If not met, operations terminate (via "No" branch to 774). If met, the blockchain is requested to perform an evaluation and consensus assessment of the transfer. Though not shown, if agreeable, via "Yes" branch wallets may be updated before terminating. If not agreeable, operations terminate (via "No" branch to 774). A verify may be performed to lookup the asset again to see the state of the blockchain and confirm the new owner (not shown).

In addition to computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects stored herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A method for generating a unique digital signature for a physical item comprising:

imaging said physical item to produce 3D spatial information and spectral data, using said 3D spatial information and said spectral data to generate a digital 3D spatial map of said physical item, mapping in 3D coordinate space physical features of said physical item, using said digital 3D spatial map to generate a unique digital signature for said physical item, comparing said unique digital signature to a plurality of previously recorded unique digital signatures corresponding to a plurality of previously imaged physical items to determine whether said physical item is identical to, part of, or completely different from any of said previously imaged physical items, wherein said comparing step includes rotating in virtual space said physical features of said physical item defined by said unique digital signature to identify a match with physical features defined by one of said plurality of previously recorded digital signatures, and recording said unique digital signature on a non-transient computer readable memory.

2. The method of claim 1, further comprising:

weighing said physical item using a scale to produce a mass reading, taking HD images of said physical items to produce HD images, using a GPS device to determine a geographic location, and appending said mass reading, said HD images and said geographic location to said unique digital signature.

3. The method of claim 1, wherein said digital 3D spatial map comprises a plurality of points (x, y, z) corresponding to relative locations in said 3D coordinate space of said physical features.

4. The method of claim 3, wherein said unique digital signature comprises a plurality of triplets [(x, y, z), (x', y', z'), (x", y", z")] of said plurality of points in said 3D coordinate space, wherein said plurality of triplets corresponds to relative distances between said physical features.

5. The method of claim 3, further comprising:

comparing said digital 3D spatial map to a plurality of previously recorded digital 3D spatial maps corresponding to a plurality of previously imaged physical items and making a determination whether said physical item is identical to, part of, or completely different from any of said previously imaged physical items.

6. The method of claim 4, further comprising:

comparing said plurality of triplets to a previously recorded plurality of triplets corresponding to a previously imaged physical item and making a determination whether said physical item is identical to, part of, or completely different from said previously imaged physical item.

7. The method of claim 5, wherein said comparing comprises:

rotating in virtual space said digital 3D spatial map to identify a match with one of said previously recorded digital 3D spatial maps.

8. The method of claim 6, wherein said comparing comprises:

rotating in virtual space said plurality of triplets to identify a match with one of said previously recorded plurality of triplets.

9. The method of claim 1, further comprising:

appending said unique digital signature to one of said plurality of pre-recorded unique digital signatures if said physical item is determined to be identical to said one of said plurality of previously imaged physical items, appending said unique digital signature to one of said plurality of pre-recorded specific physical items, if said physical item is determined to be a piece of said one of said plurality of previously imaged physical items, and saving said unique digital signature to said non-transient computer-readable memory if said physical item is determined not to be identical to or a piece of one of said plurality of previously imaged physical items.

10. The method of claim 5 further comprising:

appending said unique digital signature to one of said plurality of pre-recorded unique digital signatures if said physical item is determined to be identical to said one of said plurality of previously imaged physical items, appending said unique digital signature to one of said plurality of pre-recorded specific physical items, if said physical item is determined to be a piece of said one of said plurality of previously imaged physical items, and saving said unique digital signature to said non-transient computer-readable memory if said physical item is determined not to be identical to or a piece of one of said plurality of previously imaged physical items.

11. The method of claim 6, further comprising:

appending said unique digital signature to a pre-recorded unique digital signature if said physical item is determined to be identical to said previously imaged physical item, appending said unique digital signature to said pre-recorded unique digital signature, if said physical item is determined to be a piece of said previously imaged physical item, and saving said unique digital signature to said non-transient computer-readable memory if said physical item is determined not to be identical to or a piece of said previously imaged physical item.

12. A method for generating a unique digital signature for a physical item comprising:

in an imaging and fingerprint generating device having a housing:

supporting said physical item in said housing, illuminating said physical item with a light source mounted on or in said housing, imaging said supported and illuminated physical item to produce 3D spatial information and spectral data, transmitting said 3D spatial information and said spectral data to a computer processor, using said processor, under computer-readable instructions stored on a non-transient computer readable memory, to use said 3D spatial information and said spectral data to generate a digital 3D spatial map of said physical item, wherein said digital 3D spatial map of said physical item includes relative locations and relative distances in 3D coordinate space of physical features of said physical item, use said digital 3D spatial map to generate a unique digital signature for said physical item, and record said unique digital signature on said non-transient computer readable memory.

13. The method of claim 12, wherein said digital 3D spatial map comprises a plurality of points (x, y, z) corresponding to said relative locations in said 3D coordinate space of said physical features.

14. The method of claim 13, wherein said unique digital signature comprises a plurality of triplets [(x, y, z), (x', y', z'), (x", y", z")] of said plurality of points in said 3D coordinate space, wherein said plurality of triplets corresponds to said relative distances between said physical features.

15. The method of claim 12, further comprising:

comparing said unique digital signature to a plurality of previously recorded unique digital signatures corresponding to a plurality of previously imaged physical items and making a determination whether said physical item is identical to, part of, or completely different from any of said previously imaged physical items.

16. The method of claim 12, further comprising:

comparing said digital 3D spatial map to a plurality of previously recorded digital 3D spatial maps corresponding to a plurality of previously imaged physical items and making a determination whether said physical item is identical to, part of, or completely different from any of said previously imaged physical items.

17. The method of claim 14, further comprising:

comparing said plurality of triplets to a previously recorded plurality of triplets corresponding to a previously imaged physical item and making a determination whether said physical item is identical to, part of, or completely different from said previously imaged physical item.

18. The method of claim 15, wherein said comparing comprises:

rotating in virtual space said physical features of said physical item defined by said unique digital signature to identify a match with physical features defined by one of said plurality of previously recorded unique digital signatures.

19. The method of claim 16, wherein said comparing comprises:

rotating in virtual space said digital 3D spatial map to identify a match with a previously recorded digital 3D spatial map.

20. The method of claim 17, wherein said comparing comprises:

rotating in virtual space said plurality of triplets to identify a match with one of said previously recorded plurality of triplets.

21. An apparatus comprising:

a housing, a spectral imaging camera mounted in or on said housing, a light source mounted in or on said housing, a power source, a processor in electronic communication with said spectral imaging camera, a non-transient computer-readable memory in digital communication with said processor, said non-transient computer-readable memory comprises computer readable instructions which when executed by said processor cause said processor to:

use spectral data of a first specimen and 3D spatial information of said first specimen to generate a) a first specimen plurality of points (x, y, z) mapping in 3D coordinate space physical features of said first specimen, and b) a plurality of triplets [(x, y, z), (x', y', z'), (x", y" z")] of said first specimen plurality of points in said 3D coordinate space, and assign a unique digital signature to said first specimen, said unique digital signature comprising said first specimen said plurality of points and said plurality of triplets, wherein said physical features comprise one or more of anomalies, defects, imperfections, flaws, geometric irregularities, inclusions, occlusions, scratches, tears, and warps.

22. The apparatus of claim 21, wherein said non-transient computer-readable memory further comprises a plurality of unique digital signatures for a plurality of pre-recorded specific physical items, each of said unique digital signatures comprising a plurality of points (x, y, z) mapping in said 3D coordinate space physical features of said one of said pre-recorded specific physical items.

23. The apparatus of claim 22, wherein:

said non-transient computer-readable memory further comprises computer readable instructions which when executed by said processor cause said processor to:

receive from a remote device on a network, a unique digital signature record for a first specimen, compare said unique digital signature for said first specimen to said plurality of unique digital signatures and make a determination whether said first specimen is identical to one of said plurality of pre-recorded specific physical items, a piece of one of said plurality of pre-recorded specific physical items, or a completely different specimen.

24. The apparatus of claim 22, wherein said non-transient computer-readable memory further comprises computer readable instructions which when executed by said processor cause said processor to:

compare said unique digital signature for said first specimen to said plurality of unique digital signatures and make a determination whether said first specimen is identical to one of said plurality of pre-recorded specific physical items, a piece of one of said plurality of pre-recorded specific physical items, or a completely different specimen.

25. The apparatus of claim 22, wherein said non-transient computer-readable memory further comprises computer readable instructions which when executed by said processor cause said processor to:

rotate in virtual space said physical features of said first specimen defined by said unique digital signature of said first specimen to identify a match with physical features defined by one of said plurality of unique digital signatures.

26. The apparatus of claim 22, wherein:

each of said plurality of unique digital signatures further comprises a) a plurality of points $(x, y, z)$ mapping in said 3D coordinate space said physical features of said one of said pre-recorded specific physical items, and b) a plurality of triplets $[(x, y, z), (x', y', z'), (x'', y'', z'')]$ of said plurality of points in said 3D coordinate space.

* * * * *